(12) United States Patent
Miura et al.

(10) Patent No.: US 8,040,635 B2
(45) Date of Patent: Oct. 18, 2011

(54) SUBSTRATE FOR SUSPENSION, AND PRODUCTION PROCESS THEREOF

(75) Inventors: Yoichi Miura, Tokyo-to (JP); Tooru Serizawa, Tokyo-to (JP); Shinichiro Busujima, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 446 days.

(21) Appl. No.: 12/304,542

(22) PCT Filed: Jun. 20, 2007

(86) PCT No.: PCT/JP2007/062432
§ 371 (c)(1),
(2), (4) Date: Dec. 12, 2008

(87) PCT Pub. No.: WO2007/148728
PCT Pub. Date: Dec. 27, 2007

(65) Prior Publication Data
US 2009/0190263 A1   Jul. 30, 2009

(30) Foreign Application Priority Data
Jun. 22, 2006   (JP) .................... 2006-172591

(51) Int. Cl.
*G11B 5/48* (2006.01)
(52) U.S. Cl. .............. 360/244.3; 360/244; 360/245; 360/245.8; 360/245.9; 360/244.1
(58) Field of Classification Search .............. 360/244, 360/294, 244.3, 244.8, 244.9, 245.9
See application file for complete search history.

(56) References Cited

U.S. PATENT DOCUMENTS
6,673,256 B2 * 1/2004 Takasugi ................... 360/244.3

FOREIGN PATENT DOCUMENTS

| JP | 08-111015 A | 4/1996 |
|---|---|---|
| JP | 2005-339641 A | 12/2005 |
| JP | 2006-012205 A | 1/2006 |
| JP | 2007-058967 A | 3/2007 |

OTHER PUBLICATIONS

International Search Report; PCT/JP2007/062432.

* cited by examiner

*Primary Examiner* — Thong Q Le
(74) *Attorney, Agent, or Firm* — Ladas & Parry LLP

(57) ABSTRACT

A substrate for suspension which is produced at low costs and can sufficiently attain the prevention of damage by electrostatic discharge and restraint of noises. The substrate for suspension includes: a metallic substrate, an insulating layer formed on the metallic substrate and having an opening from which the metallic substrate is exposed, a grounding-wiring layer formed on the insulating layer and arranged near the opening, and a ground terminal formed in the opening and contacting the metallic substrate and the grounding-wiring layer. The ground terminal is made of a metal having a melting point of 450° C. or lower.

11 Claims, 9 Drawing Sheets

SUBSTRATE FOR SUSPENSION, AND PRODUCTION PROCESS THEREOF

TECHNICAL FIELD

The present invention relates to a substrate for suspension which is produced at low costs, and can sufficiently prevent damage by electrostatic discharge and restrain noises.

BACKGROUND ART

In recent years, due to the spread of the Internet and others, the information processing amount of personal computers and the processing speed of information have been required to be increased. Following to that, it has been requested that the capacity of hard disc drives (HDDs) integrated into personal computers and the speed of information transmission are made larger. The type of the component for supporting a magnetic head used in an HDD, which is called a magnetic head suspension, has also been shifting from a conventional type, to which signal lines such as gold wires are connected, to a wiring-integrated type, i.e., the so-called wireless suspension type, wherein signal lines such as copper wires are fitted directly to a stainless steel spring.

Recently, demands for HDDs to be mounted into various small-sized devices, typical examples of which are portable devices, have been increasing. For this reason, the density of HDDs has been made higher, and further the size of magnetic heads has been becoming smaller. Thus, with an increase in the sensitivity of the magnetic heads, the magnetic heads are easily affected by electrostatic charging. Accordingly, there is caused a problem that the properties of small-sized magnetic head elements are changed by electric charges collected in their sliders, and at worst the elements are broken.

Another problem is the following problem: in order to improve the signal transmission speed and precision of HDDs, there has been a tendency that electric signals having a higher frequency are used in recent years; as the frequency becomes higher, noises of transmitted electric signals increase. It has been considered that a cause for generating noises is based on a difference in potential between the metallic substrate and the wiring layer.

Against these problems, for example, Patent Document 1 discloses the following matters for preventing a damage of a magnetic head by electrostatic discharge: the use of an electroconductive resin between the magnetic head and the suspension for the purpose of attaining electric connection; the formation of an earth electrode on the suspension side from an electroconductive material such as copper by sputtering, plating, vapor deposition or the like; and others.

For example, Patent Document 2 discloses a method to restrain the generation of noises, wherein a ground terminal is set up on a wired suspension for attaining a short circuit between wiring and a substrate for the suspension. In the process of forming the ground terminal, an additive method is used; therefore, required are the step of forming a power-feeding layer through a dry process, and the step of forming a wiring layer by electrolytic plating.

According to the above-mentioned prior arts, it is necessary to conduct a process for which a relatively long time is required, such as sputtering, plating or vapor deposition, when an earth electrode or a ground terminal is formed. For this reason, there remain problems that the productivity is low and costs increase.

Patent Document 1: Japanese Patent Application publication (JP-A) No. 08-111015
Patent Document 2: JP-A No. 2006-12205

DISCLOSURE OF THE INVENTION

Problems to be solved by the invention

In light of the above-mentioned situation, the invention has been made. A main object thereof is to provide a substrate for suspension which is produced at low costs and can sufficiently attain the prevention of damage by electrostatic discharge and restraint of noises.

Means for Solving the Problems

To resolve the above-mentioned problems, the present invention provides a substrate for suspension, comprising: a metallic substrate, an insulating layer formed on the metallic substrate and having an opening from which the metallic substrate is exposed, a grounding-wiring layer formed on the insulating layer and arranged near the opening, and a ground terminal formed in the opening and contacting the metallic substrate and the grounding-wiring layer, characterized in that the ground terminal is made of a metal having a melting point of 450° C. or lower.

According to the invention, the melting point or the liquid phase point of the metal used to form the ground terminal is relatively low; therefore, the invention has an advantage that the ground terminal can easily be formed.

In the above-mentioned invention, the ground terminal is preferably a convex shape having an apex inside a region of the opening in planar view. The thus-shaped ground terminal can be formed by, for example, a method of dropping the metal, which has a melting point of 450° C. or lower, quantitatively in the state that the metal is melted. This method makes it easy to decrease costs or simplify the process.

In the above-mentioned invention, a metal forming the ground terminal is preferably a lead-free solder. Thereby, the impact of the present invention to the environment can be lessening.

In the above-mentioned invention, the grounding-wiring layer is preferably formed to surround the opening in planar view, and further characterized in that the grounding-wiring layer has an air vent section for restraining an air reservoir generated when the ground terminal is formed. By restraining the generation of the air reservoir, the contact area between the ground terminal and the metallic substrate can be made sufficiently large.

In the above-mentioned invention, a form of the grounding-wiring layer near the opening is preferably a line form. Thereby, the air reservoir is less likely to be generated.

In the above-mentioned invention, the ground terminal is preferably formed only inside a region surrounded by an edge of the opening. The grounding-wiring layer arranged near the opening can be made small so that space-saving can be attained and the substrate can be made light.

In the above-mentioned invention, an intermetallic compound layer is preferably formed in a joint interface between the ground terminal and the metallic substrate. Electric connection between the ground terminal and the metallic substrate becomes better so that the electric resistance becomes low.

The present invention provides a process for producing a substrate for suspension, comprising steps of: preparing a substrate-forming member which comprises a metallic substrate, an insulating layer formed on the metallic substrate and having an opening from which the metallic substrate is exposed, and a grounding-wiring layer formed on the insulating layer and arranged near the opening; and a ground-terminal-forming step of dropping a metal having a melting point of 450° C. or lower quantitatively into the opening in a state that the metal is melted, and forming a ground terminal contacting the metallic substrate and the grounding-wiring layer.

According to the invention, the melted metal is dropped into the opening so as to form a ground terminal, whereby costs can be decreased and the process can be simplified.

In the above-mentioned invention, a dropping method for dropping the metal quantitatively in the state that the metal is melted is preferably a method of using plural metallic balls each having a predetermined diameter, and melting and dropping the metallic balls successively. By appropriately selecting the diameter of metallic balls as a feedstock, the drop amount of the melted metal can be freely adjusted.

In the above-mentioned invention, when the metal is dropped in the state that the metal is melted, the diameter of the melted metal is preferably smaller than a diameter of the opening. By making the diameter of the melted metal smaller than that of the opening, the melted metal can be caused to hit with a larger certainty.

Effects of the Invention

The invention produces an advantageous effect of providing a substrate for suspension which is produced at low costs and can sufficiently attain the prevention of damage by electrostatic discharge and restraint of noises.

DESCRIPTION OF REFERENCE NUMERALS

Figure 1:
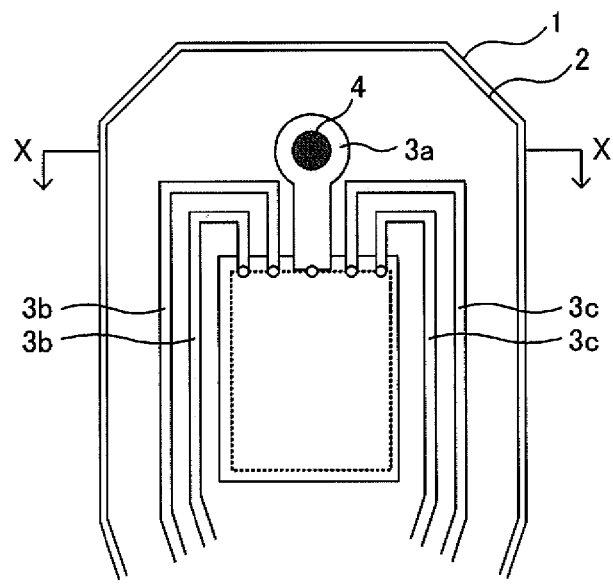
FIG. 1 is a schematic plane view illustrating an embodiment of the substrate for suspension of the invention.

1: metallic substrate
2: insulating layer
3a: grounding-wiring layer
3b: writing wiring layer
3c: reading wiring layer
4: ground terminal
5: opening
6: air reservoir
7: air vent portion
8: coverlay
10: substrate-forming member
11: dropping device
12: melted metal

BEST MODE FOR CARRYING OUT THE INVENTION

The substrate for suspension of the invention, and the production process thereof will be described in detail hereinafter.
A. Substrate for Suspension First, a substrate for suspension of the present invention will be explained. The substrate for suspension of the present invention comprises: a metallic substrate, an insulating layer formed on the metallic substrate and having an opening from which the metallic substrate is exposed, a grounding-wiring layer formed on the insulating layer and arranged near the opening, and a ground terminal formed in the opening and contacting the metallic substrate and the grounding-wiring layer, characterized in that the ground terminal is made of a metal having a melting point of 450° C. or lower.

According to the invention, the melting point of the metal used to form the ground terminal is relatively low; therefore, the invention has an advantage that the ground terminal can easily be formed. Ground terminals formed by sputtering, vapor deposition, plating or the like in the prior art are obtained through a process for which a relatively long time is required. Thus, the ground terminals have problems that the productivity is low and costs increase. In the invention, however, the ground terminal can easily be formed, for example, by dropping a melted metal into the opening, as described later.

The following will describe the substrate for suspension of the invention, using the drawings. FIG. 1 is a schematic plane view illustrating an embodiment of the substrate for suspension of the invention, more specifically, an enlarged schematic plane view illustrating a tip portion thereof on which a magnetic head slider is mounted. The substrate for suspension illustrated in FIG. 1 has a structure wherein a patterned wiring layer (a grounding-wiring layer 3a, a writing wiring layer 3b and a reading wiring layer 3c) made of Cu is formed on SUS, which works as a metallic substrate 1 and has a spring property so as to interpose a polyimide as an insulating layer 2 therebetween. Furthermore, the substrate for suspension illustrated in FIG. 1 has a ground terminal 4 for connecting the metallic substrate 1 and the grounding-wiring layer 3a electrically to each other.

Figure 2:
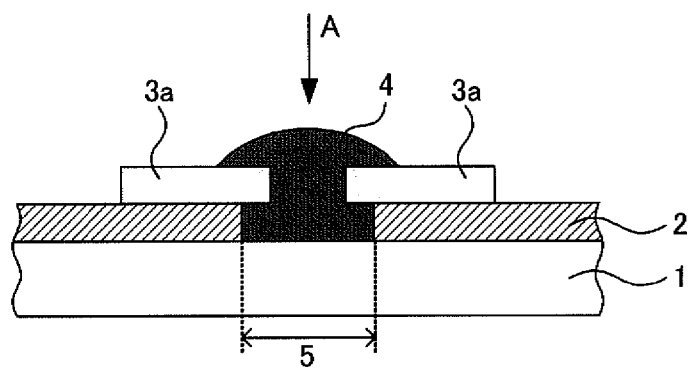
FIG. 2 is an X-X sectional view of FIG. 1.

FIG. 2 is an X-X sectional view of FIG. 1. As illustrated in FIG. 2, the substrate for suspension of the invention has: the metallic substrate 1, the insulating layer 2 formed on the metallic substrate 1 and having an opening 5 from which the metallic substrate 1 is exposed, the grounding-wiring layer 3a formed on the insulating layer 2 and arranged near the opening 5, and the ground terminal 4 formed in the opening 5 and contacting the metallic substrate 1 and the grounding-wiring layer 3a. The invention is characterized in that the ground terminal 4 is made of a metal having a specified melting point.

Figure 3:
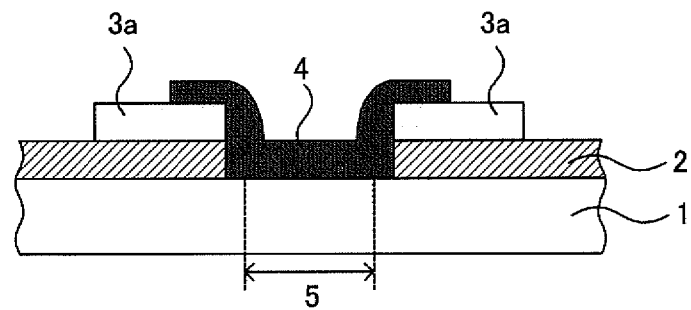
FIG. 3 is a schematic sectional view illustrating the shape of a ground terminal formed by plating.

As illustrated in FIG. 2, in the invention, it is preferred that the ground terminal 4 has a convex shape having an apex in the region of the opening 5 in planar view (along the direction A in FIG. 2). The thus-shaped ground terminal can be formed by, for example, a method of dropping a melted metal into the opening. This method makes it easy to decrease costs or simplify the process. When a melted metal is dropped into the opening, the melted metal usually flows after the metal hits, so that a convex shape the apex of which is the spot where the metal hits is formed. In other words, it is preferred that the ground terminal is formed by dropping a metal having a melting point of 450° C. or lower quantitatively in the state that the metal is melted. In the meantime, when the ground terminal in the invention is formed by plating, the shape of the ground terminal 4 comes to have a concave portion near the center of the opening 5, as illustrated in FIG. 3.

The substrate for suspension of the invention will be described hereinafter in accordance with the individual constituents thereof.

1. Ground Terminal

First, the ground terminal used in the invention is described. The ground terminal used in the invention is a member formed in the opening, which will be described later, and contacting the metallic substrate and the grounding-wiring layer to have a function of causing the two to be electrically connected to each other. Furthermore, the ground terminal used in the invention is characterized by being made of a metal having a melting point of 450° C. or lower. It is preferred that the melting point of the metal is 350° C. or lower, in particular, 250° C. or lower. When the melting point of the metal is low, the metal is easily melted so that the ground terminal can be simply and easily formed.

The "melting point" in the invention refers to a temperature at which a material in a solid phase state keeps equilibrium with a liquid phase thereof under a given pressure, and may be called the fusing point. In the case of a simple metal, or two or more components having a eutectic composition (a mixture of two or more crystals that are simultaneously crystallize out a liquid containing two or more components), the melting point is consistent with the freezing point (temperature at which the liquid solidifies) thereof. In the case of a metal which is composed of two or more components coexisting while keeping equilibrium and does not have any eutectic composition, a phase diagram is viewed which shows the relationship between the compositions of the liquid and the solid, which are composed of the two or more components coexisting while keeping equilibrium, and the temperature, that is, the melting point. In this case, the temperature (melting point) is taken on the vertical axis thereof and the composition (ratio between the components) is taken on the transverse axis thereof, and the temperature at which the liquid phase and the solid phase keep equilibrium is drawn in connection with the composition of the liquid phase. As a result, a liquidus is gained. The liquid phase point therein is defined as the melting point.

The lower limit of the melting point of the metal is not particularly limited as far as the limit permits the metal to be in a solid state at normal temperature (25° C.). The limit is usually 100° C.

The melting point of the metal can be measured by differential thermal analysis (DTA) or differential scanning calorimetry (DSC) in accordance with JIS Z3198-1. A thermal analyzer therefor is, for example, DSC 8230 or TG 8120 manufactured by Rigaku Corporation.

The metal used in the invention may be a simple metal or an alloy as far as the metal has a melting point of the above-mentioned value or lower. In the invention, the metal is preferably an alloy. When a metal having a low melting point is mixed, an alloy having a low melting point can easily be obtained; thus, metals of various kinds can be used.

The alloy is not particularly limited as far as the alloy has a melting point of the above-mentioned value or lower. Specifically, the alloy is an alloy containing at least two selected from the group consisting of tin (Sn), lead (Pb), zinc (Zn), silver (Ag), copper (Cu), indium (In), bismuth (Bi), antimony (Sb), nickel (Ni) and germanium (Ge), or some other alloy. It is preferred in the invention that the alloy is an alloy containing at least two selected from the group consisting of tin (Sn), lead (Pb), silver (Ag), copper (Cu) and bismuth (Bi).

In the invention, it is also preferred to use, as the alloy, solder. Solder can be roughly classified to lead-containing solder and lead-free solder. In the invention, lead-containing solder refers to a melting material made mainly of lead (Pb) and tin (Sn) and having a melting point of the above-mentioned temperature or lower. Lead-free solder refers to a melting material made mainly of tin (Sn) without containing lead (Pb) and having a melting point of the above-mentioned temperature or lower. In the invention, it is preferred to use, as the alloy, lead-free solder since loads onto the environment can be decreased.

Specific examples of the above-mentioned lead-free solder include Sn—Sb based, Sn—Cu-based, Sn—Cu—Ni based, Sn—Ag based, Sn—Ag—Cu based, Sn—Ag—Cu—Bi based, Sn—Zn based, Sn—Ag—In—Bi based, Sn—Zn based, Sn—Bi based, Sn—In based, and Sn—Sb based solders.

Specific examples of the above-mentioned lead-containing solder include Sn—Pb based, Sn—Ag—Pb based, Sn—Pb—Bi based, Sn—Sb—Pb based, and Sn—Ag—Sb—Pb based solders.

In the meantime, the simple metal is not particularly limited as far as the metal has a melting point of the above-mentioned value or lower. Examples thereof include tin (Sn) and lead (Pb).

The shape of the ground terminal is not particularly limited as far as the shape permits the metallic substrate and the grounding-wiring layer to be electrically connected to each other. The shape of the ground terminal is varied in accordance with the shape of the opening, which will be described later, and other factors.

The resistance value of the ground terminal is not particularly limited, and is preferably, for example, 5Ω or less, more preferably 1Ω or less, in particular preferably 0.5Ω or less.

In the case of melting a low-melting-point metal and dropping the metal in an opening in an insulating layer, thereby forming the ground terminal, it is allowable in the invention to conduct flux treatment in order to remove a metal oxide film formed on the surface of the metal, such as SUS. Such flux treatment is a treatment which is not conducted in the case of forming a ground terminal by plating or the like. Therefore, when it is checked whether or not a residue of the flux is present, it is possible to judge whether or not the ground terminal is produced by plating or the like. Whether or not the flux residue is present can be checked by ion chromatography, AES (atomic emission spectroscopy) and XPS (X-ray photoelectron spectroscopy).

It is also preferred in the invention that the ground terminal is formed only inside a region surrounded by the edge of the opening. This makes it possible to make the grounding-wiring layer arranged near the opening small, and attain space-saving and a reduction in the weight. When the vicinity of the ground terminal can be made light, the metallic substrate can also be made thin.

Figure 4A:
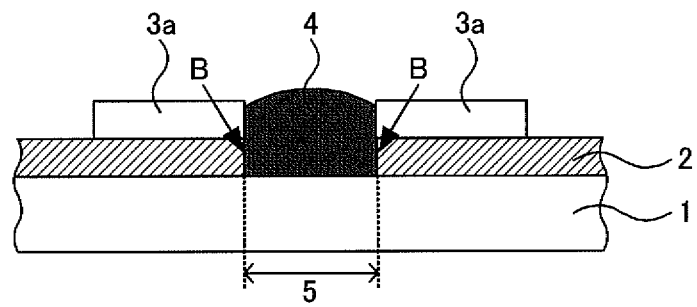
FIGS. 4A and 4B are a schematic sectional view for explaining a ground terminal in the invention.
Figure 4B:
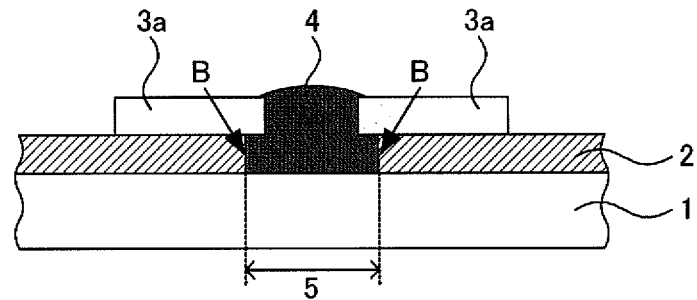

As illustrated in FIG. 4A, a specific example thereof is a substrate for suspension wherein the ground terminal 4 is formed only inside a region surrounded by an edge B of the opening 5. As illustrated in FIG. 4B, in the invention, allowable is a substrate for suspension wherein the grounding-wiring layer 3a has a smaller opening than the opening 5. In order to improve the joint reliability, it is preferred that the ground terminal is formed to be filled into the opening. In the meantime, in order to make the substrate light, the ground terminal may be formed not to be filled into a part of the opening.

An example of the method for forming the ground terminal includes a method, wherein when a metal is dropped into the opening in the state that the metal is melted, the diameter of the melted metal is made smaller than that of the opening, as will be described in "B. Process for producing a substrate for suspension", which is located later.

Figure 5:
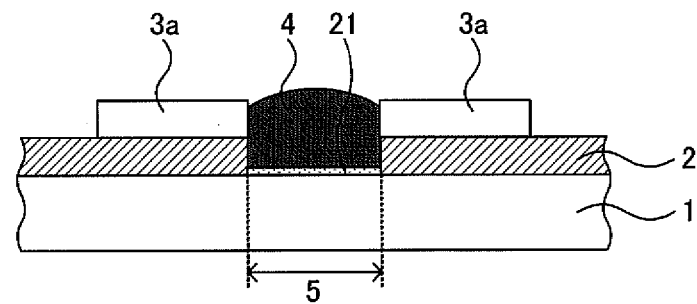
FIG. 5 is a schematic sectional view for explaining a ground terminal in the invention.

It is also preferred in the invention that an intermetallic compound layer is formed in a joint interface between the ground terminal and the metallic substrate. This makes it possible to make electric connection between the ground terminal and the metallic substrate better so that the electric resistance becomes low. As illustrated in FIG. 5, a specific example thereof includes a substrate for suspension wherein an intermetallic compound layer 21 is formed in a joint interface between the ground terminal 4 and the metallic substrate 1.

The intermetallic compound layer usually has both components of the metal constituting the ground terminal and the metal constituting the metallic substrate. For example, in the case of using Cu or Au as the metal constituting the ground terminal and using SUS 304 as the metallic substrate, the intermetallic compound layer has a Cu element, a Au element, a Sn element, and so on.

About the composition of the intermetallic compound layer, a cross section thereof can be measured by, for example, EDX or AES.

The film thickness of the intermetallic compound layer is not particularly limited as far as the thickness permits electric connectivity between the ground terminal and the metallic substrate to be improved. The film thickness is preferably in the range of, for example, 0.1 µm to 5.0 µm, in particular preferably in the range of 1.0 µm to 3.0 µm.

An example of the method for forming the intermetallic compound layer includes a method of removing the oxide film from the exposed metallic substrate, and then bringing the melted metal and the exposed metallic substrate into contact with each other before a metal oxide film is formed on the surface of the metallic substrate after the metallic substrate being washed, as will be described in "B. Process for producing a substrate for suspension", which is located later.

2. Insulating Layer and Grounding-Wiring Layer

Next, the insulating layer and the grounding-wiring layer used in the invention are described. The insulating layer used in the invention is a layer formed over the metallic substrate and having an opening from which the metallic substrate is exposed. The grounding-wiring layer used in the invention is a layer formed on the insulating layer and arranged near the opening.

The insulating layer used in the invention has an opening from which the metallic substrate is exposed at a position where the ground terminal is to be formed. The shape of the opening is not particularly limited as far as the shape permits the ground terminal to cause the metallic substrate and the grounding-wiring layer to be electrically connected to each other. The shape is, for example, a circle; an ellipse; any polygon such as a rectangle or a pentagon; a comb-shape; a cross shape; or a rod shape. The shape of the opening is generally a circle. When the shape of the opening is a circle, the diameter thereof is usually from about 50 µm to 300 µm.

Figure 6:
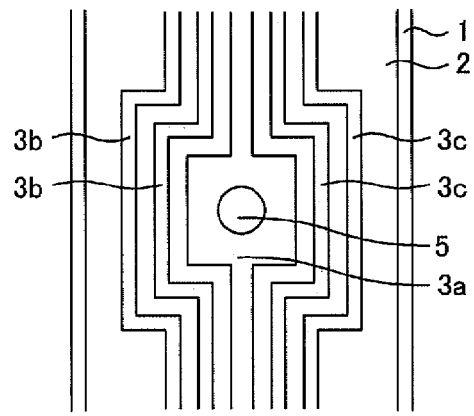
FIG. 6 is a schematic plane view illustrating another embodiment of the substrate for suspension of the invention.

The position of the opening is not particularly limited, and thus the opening may be made in any position as far as the position is a position permitting the ground terminal to cause the metallic substrate and the grounding-wiring layer to be electrically connected to each other. For example, as illustrated in FIG. 1, the opening may be made at the tip portion of the substrate for suspension, on which a magnetic head slider is mounted. As illustrated in FIG. 6, the opening may be made in a portion other than the tip portion of the substrate for suspension. In FIG. 6, the grounding-wiring layer 3a is formed between the writing wiring layer 3b and the reading wiring layer 3c, and the opening 5 is made inside a region of the insulating layer 2 where the grounding-wiring layer 3a is formed.

In the meantime, the grounding-wiring layer used in the invention is formed on the insulating layer and further arranged near the opening. In the invention, the grounding-wiring layer and the metallic substrate are electrically connected to each other through the ground terminal. The wording "near the opening" refers to locations where the layer can be substantially grounded to the opening through the ground terminal. The locations refer to, for example, a region from the edge of the opening to points 50 µm apart therefrom.

Figure 7:
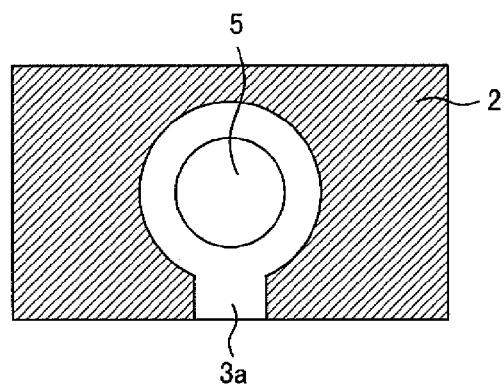
FIG. 7 is a schematic plane view for explaining a grounding-wiring layer used in the invention.

The shape of the grounding-wiring layer is not particularly limited and may be set to any shape as far as the shape permits the layer to be electrically connected to the metallic substrate through the ground terminal. Usually, the grounding-wiring layer is formed to surround the opening in planar view. Specifically, as illustrated in FIG. 7, the grounding-wiring layer 3a is formed to surround the opening 5 formed in the insulating layer 2 in planar view.

Figure 8:
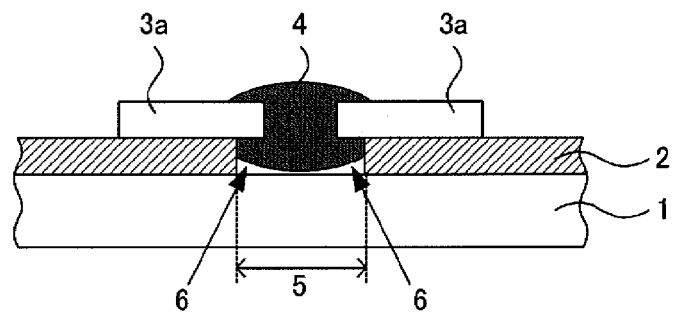
FIG. 8 is a schematic sectional view for explaining an air reservoir.

In a case where the grounding-wiring layer is formed to surround the opening in planar view as described above and further, as will be described later, the ground terminal is formed by melting a low-melting-point metal and dropping the metal in the opening, a space into which air is discharged is lost at the time of the dropping, so that an air reservoir is generated. As a result, contact between the ground terminal and the metallic substrate may become insufficient. Specifically, as illustrated in FIG. 8, an air reservoir 6 is generated so that contact between the ground terminal 4 and the metallic substrate 1 may become insufficient.

Figures 9A, 9B:
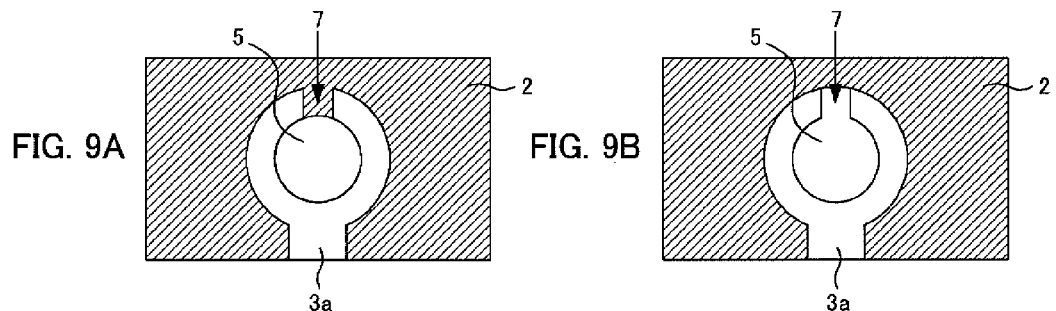
FIGS. 9A and 9B are a schematic plane view for explaining an air vent section.

In a case as described above, therefore, it is preferred that at least one of the grounding-wiring layer and the insulating layer has an air vent section for restraining an air reservoir generated when the ground terminal is formed. The restraint of the generation of the air reservoir makes it possible to make the contact area between the ground terminal and the metallic substrate sufficiently large. An example of the grounding-wiring layer having the air vent section includes the grounding-wiring layer 3a having an air vent section 7 as illustrated in FIG. 9A. Similarly, both of the grounding-wiring layer 3a and the insulating layer 2 may have air vent sections 7 (FIG. 9B). Only the insulating layer may have an air vent section (not illustrated). In a case where the grounding-wiring layer is made of copper, an air vent section having a size of about 20 µm to 50 µm may be formed. The grounding-wiring layer or the insulating layer may have plural air vent sections.

Figure 10A:
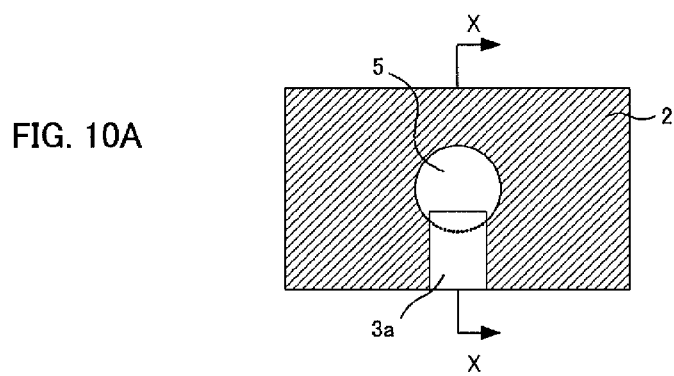
FIGS. 10A and 10B are an explanatory view for explaining a grounding-wiring layer used in the invention.
Figure 10B:
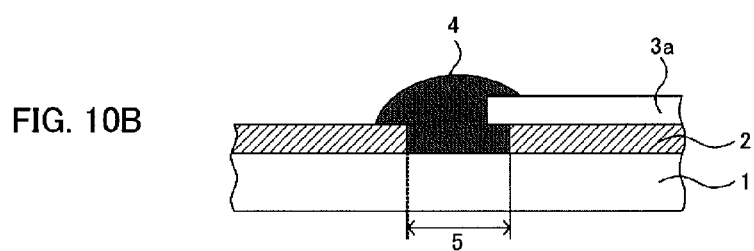
Figure 11A:
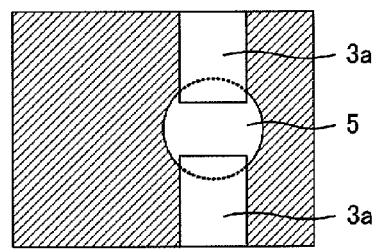
FIGS. 11A and 11B are a schematic plane view for explaining a grounding-wiring layer used in the invention.
Figure 11B:
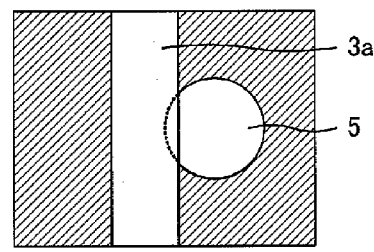

In the invention, the grounding-wiring layer may not be formed to surround the opening in planar view. Specifically, as illustrated in FIG. 10A, the grounding-wiring layer 3a may be formed merely near the opening 5. In other words, the form of the grounding-wiring layer near the opening may be a line form. As illustrated in FIG. 10B, in such a case also, the ground terminal 4 can sufficiently cause the grounding-wiring layer 3a and the metallic substrate 1 to be electrically connected to each other. In this case, it is unnecessary to provide the air vent section to the grounding-wiring layer or the insulating layer. As illustrated in FIG. 11A, plural line-form grounding-wiring layers 3a may be formed near the opening 5. This makes it possible to improve the joint reliability. As illustrated in FIG. 11B, a line-form grounding-wiring layer 3a may be formed so as to contact the opening 5 when they are viewed in plane view. This makes it possible to improve the design-flexibility in the position of the opening.

Figure 12A:
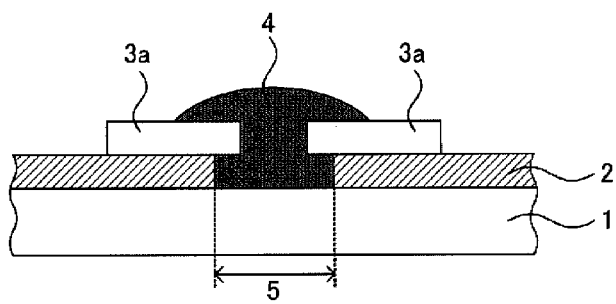
FIGS. 12A to 12C are a schematic sectional view for explaining a grounding-wiring layer used in the invention.
Figure 12B:
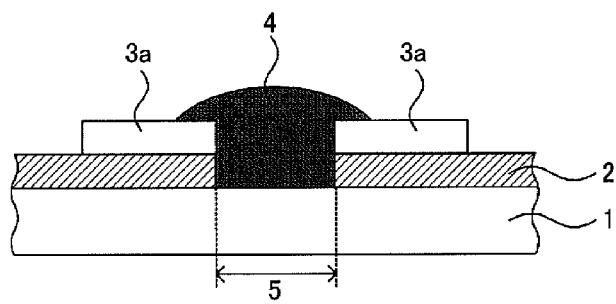
Figure 12C:
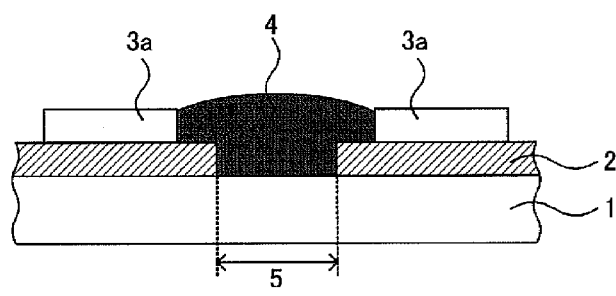

As illustrated in FIG. 12A, in the invention, the grounding-wiring layer 3a may have a smaller opening than the opening 5. As illustrated in FIG. 12B, the grounding-wiring layer 3a may have an opening the size of which is equal to that of the opening 5. As illustrated in FIG. 12C, the grounding-wiring layer 3a may have a larger opening than the opening 5.

Figure 13:
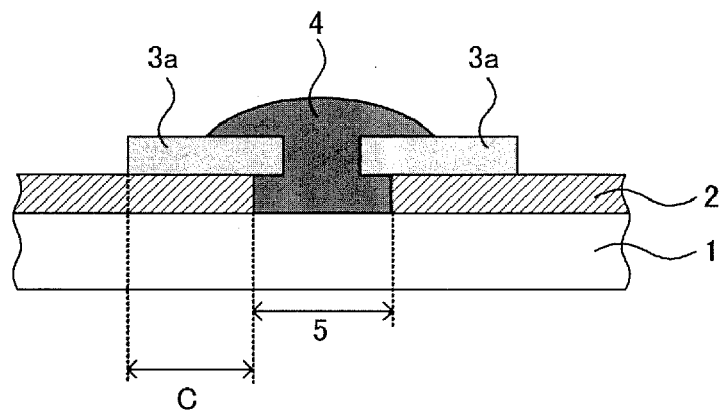
FIG. 13 is a schematic sectional view for explaining the size of a grounding-wiring layer used in the invention.

As will be described later, in the invention, a metal having a melting point of 450° C. or lower is quantitatively dropped into the opening in the state that the metal is melted, whereby the ground terminal contacting the metallic substrate and the grounding-wiring layer can be formed (see FIGS. 16A to 16C, which will be referred to later). In this case, the grounding-wiring layer can be made smaller than in conventional methods for forming a ground terminal, such as plating. As a result, space-saving and a reduction in the weight can be attained. In order to prevent deterioration in the insulating layer, it is preferred to form the grounding-wiring layer in such a manner that the ground terminal and the insulating layer do not contact each other. As illustrated in FIG. 13, the distance between the edge of the opening 5 and an end of the grounding-wiring layer 3a, the end being farther from the opening 5, is determined as the distance C. When the above-mentioned method is used to form the ground terminal in the invention, the grounding-wiring layer can be made smaller than the case of plating or the like in the prior art is used. In this case, the distance C can be set to 75 µm or less, in particular, 50 µm or less.

As will be described later, it is preferred in the invention that at the time of dropping a metal into the opening in the state that the metal is melted, the diameter of the melted metal is made smaller than that of the opening (see FIGS. 17A to 17C, which will be referred to later). This makes it possible to make the grounding-wiring layer arranged near the opening even smaller. In this case, the distance C may be set to 40 µm or less, in particular, 30 µm or less. In order to keep the mechanical strength of the grounding-wiring layer certainly, the distance C is usually 20 µm or more.

The thickness of the insulating layer is not particularly limited as far as the thickness permits the layer to exhibit desired insulating properties. The thickness is usually from about 5 µm to 10 µm. The thickness of the grounding-wiring layer is not particularly limited as far as the thickness permits the layer to exhibit a desired electroconductivity. The thickness is usually from about 6 µm to 18 µm.

The material of the insulating layer is, for example, polyimide (PI). The material of the grounding-wiring layer is, for example, copper (Cu). Furthermore, the grounding-wiring layer may be plated with nickel (Ni) or gold (Au). When the layer is plated with, in particular, gold (Au), the bondability between the solder and the grounding-wiring layer is improved; however, if the thickness of the gold plating is large, brittle Au of the plating and Sn of the solder diffuse mutually in the bonding interface between Au and the solder, so that a very brittle intermetallic compound of Au—Sn is generated or Kirkendal voids are generated by a difference in diffusion speed between the two metals. As a result, the bonding state may become instable. Thus, the thickness of the gold plating is preferably 0.5 µm or less, more preferably from about 0.1 µm to 0.2 µm.

3. Metallic Substrate

Next, the metallic substrate used in the invention is described. The metallic substrate used in the invention is not particularly limited as far as the metallic substrate has electroconductivity. Since the substrate for suspension of the invention is used for a suspension, the metallic substrate usually has an appropriate spring property.

It is preferred in the invention that the metallic substrate has an electroconductive layer on the front surface side thereof, wherein the opening is formed. The formation of the electroconductive layer makes it possible to make electric connection through the ground terminal more effective. The material of the electroconductive layer is specifically copper (Cu) or the like. The electroconductive layer may be formed by, for example, plating.

The thickness of the metallic substrate is varied in accordance with the material of the metallic substrate, and others, and is not particularly limited. The thickness usually ranges from 5 µm to 20 µm. The material of the metallic substrate is, for example, SUS.

4. Others

Figure 14A:
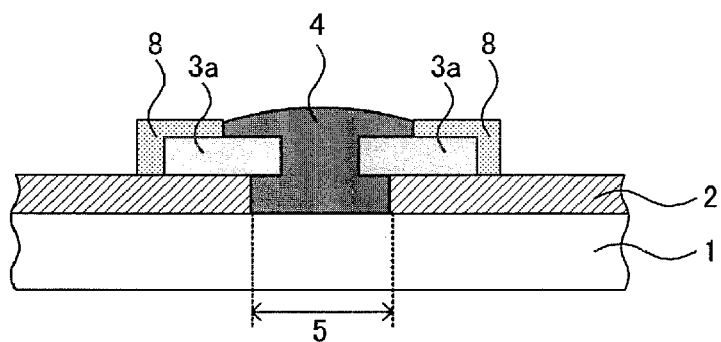
FIGS. 14A and 14B are a schematic sectional view for explaining a coverlay used in the invention.
Figure 14B:
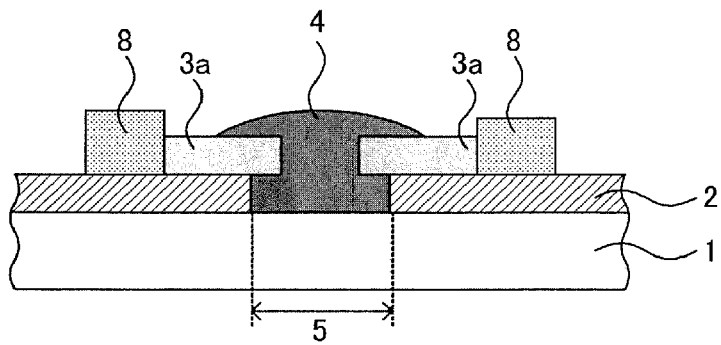

The substrate for suspension of the invention has at least the above-mentioned metallic substrate, insulating layer, which has an opening, grounding-wiring layer, and ground terminal. Furthermore, the substrate for suspension of the invention usually has a coverlay (CL) on the grounding-wiring layer. As illustrated in FIG. 14A, in the invention, a coverlay 8 may be formed to cover a part of the grounding-wiring layer 3a. As illustrated in FIG. 14B, a coverlay 8 may be formed not to cover the grounding-wiring layer 3a. The former falls within the so-called SMD (solder mask defined), and the latter falls within the so-called NSMD (non-solder mask defined). The thickness of the coverlay is not particularly limited, and is usually from 5 µm to 30 µm, in particular preferably from 5 µm to 15 µm. The material of the coverlay is not particularly limited, and may be equivalent to that of a coverlay used in an ordinary flexible substrate or the like.

Figure 15A:
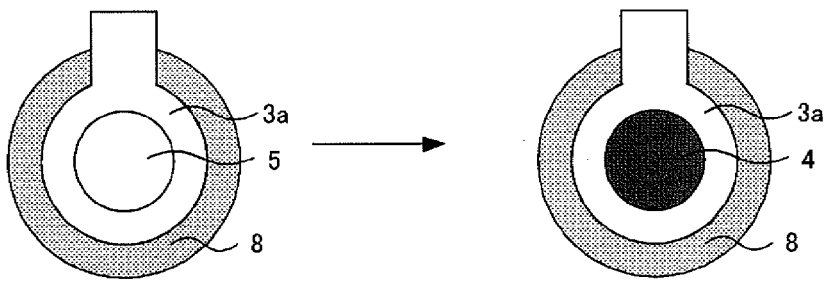
FIGS. 15A to 15D are a schematic plane view illustrating the structure of the vicinity of a ground terminal used in the invention.
Figure 15B:
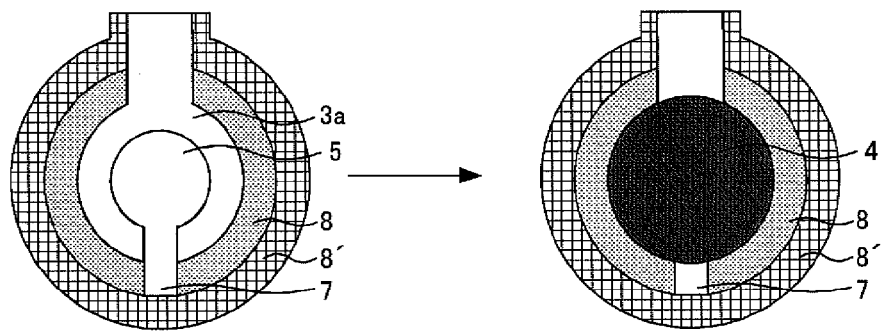
Figure 15C:
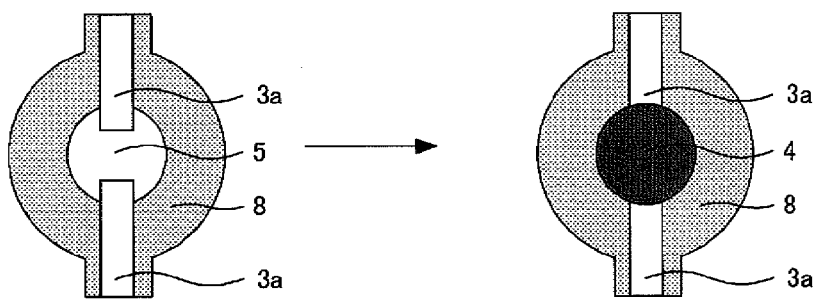
Figure 15D:
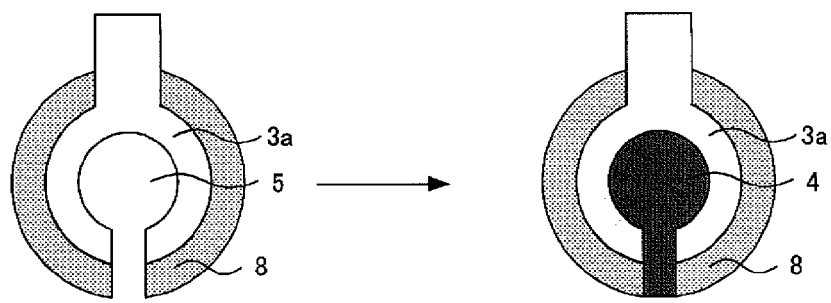

FIGS. 15A to 15D illustrate schematic plane views illustrating embodiments of the structure of the vicinity of a ground terminal in the invention. FIG. 15A illustrates an NSMD type ground terminal 4, wherein a coverlay 8 does not cover a grounding-wiring layer 3a, and the ground terminal 4 is formed along an opening in the grounding-wiring layer 3a. FIG. 15B illustrates an SMD type ground terminal 4, wherein a coverlay (coverlay for grounding-wiring layer) 8 covers a part of a grounding-wiring layer 3a, and the present structure has an air vent section 7, the coverlay 8 for grounding-wiring layer, and a coverlay 8' for insulating layer. In this case, the ground terminal 4 is formed along an opening in the coverlay 8 for grounding-wiring layer. FIG. 15C illustrates an SMD type ground terminal 4, wherein a coverlay 8 covers a part of a grounding-wiring layer 3a, and this layer 3a is in a line form. In this case, the ground terminal 4 is formed along an opening in the coverlay 8. FIG. 15D illustrates an NSMD type ground terminal 4, wherein a coverlay 8 does not cover a part of a grounding-wiring layer 3a, and the present structure has an air vent section 7. In this case, the ground terminal 4 is formed along an opening in the grounding-wiring layer 3a.

The substrate for suspension of the invention usually has a writing wiring layer and a reading wiring layer besides the grounding-wiring layer explained above. The writing wiring layer and the reading wiring layer may be made of the same material of which the grounding-wiring layer is made, and may be made of a material different from the material of the grounding-wiring layer. Usually, the layers are made of the same material. This makes it possible to decrease costs.

The article for which the substrate for suspension of the invention is used is not particularly limited, and is, for example, a magnetic head suspension of a hard disc drive (HDD).

B. Process for Producing a Substrate for Suspension

Next, a process for producing a substrate for suspension of the present invention will be explained. The process for producing a substrate for suspension of the present invention comprises steps of: preparing a substrate-forming member which comprises a metallic substrate, an insulating layer formed on the metallic substrate and having an opening from which the metallic substrate is exposed, and a grounding-wiring layer formed on the insulating layer and arranged near the opening; and a ground-terminal-forming step of dropping a metal having a melting point of 450° C. or lower quantitatively into the opening in a state that the metal is melted, and forming a ground terminal contacting the metallic substrate and the grounding-wiring layer.

According to the invention, the melted metal is dropped into the opening so as to form a ground terminal, whereby costs can be decreased and the process can be simplified. For example, in the case of forming a ground terminal by plating in the prior art, many steps are required, examples of which include the step of laminating a dry film; the step of exposing the dry film to light; the step of developing the exposed dry film; the step of removing an oxide film on the surface of SUS for an opening wherein the ground terminal is to be formed; the step of plating the inside of the opening; and the step of peeling off the dry film. Furthermore, in order to plate the inside of the opening, which is very fine, many other regions need to be masked. This is a very inefficient work. On the other hand, in the invention, a ground terminal can be formed only through the step of dropping a melted metal and an optional step of subjecting a metallic substrate to pre-treatment. Thus, costs can be reduced and the process can be made simple.

In the invention, heating is essential for melting the metal; however, it is unnecessary in principle to heat a substrate for suspension (substrate-forming member) before a ground terminal is formed. It is therefore possible to prevent, for example, polyimide, which is used for an insulating layer, from deteriorating. For example, when a ground terminal is formed by plating in the prior art, the resultant ground terminal is brittle so that the terminal may not have a sufficient strength in a case where the shape of the opening is complicated. On the other hand, in the invention, the metal is dropped in the state that the metal is melted; therefore, the invention has an advantage that it never happens that the resultant ground terminal is brittle unlike the case of plating. Moreover, according to the invention, a ground terminal can be formed in an opening having any shape.

The following will describe the process for producing a substrate for suspension of the invention, using the drawings. FIGS. 16A to 16C are process charts illustrating an embodiment of the process for producing a substrate for suspension of the invention. The process illustrated in FIGS. 16A to 16C, for producing a substrate for suspension, has: a process of preparing a substrate-forming member 10 having a metallic substrate 1, an insulating layer 2 formed on the metallic substrate 1 and having an opening 5 from which the metallic substrate 1 is exposed, and a grounding-wiring layer 3a formed on the insulating layer 2 and arranged near the opening 5 (FIG. 16A); and a ground-terminal-forming step of using a dropping device 11 to drop a melted metal 12 quantitatively into the opening 5 (FIG. 16B), thereby forming a ground terminal 4 contacting the metallic substrate 1 and the grounding-wiring layer 3a (FIG. 16C).

1. Ground-Terminal-Forming Step

First, the ground-terminal-forming step in the invention is described. In the ground-terminal-forming step in the invention, the above-mentioned substrate-forming member is used. This substrate-forming member is a member having at least a metallic substrate, an insulating layer having an opening, a grounding-wiring layer, and a ground terminal. About these constituting members, the contents thereof are the same as described in the item "A. Substrate for suspension"; thus, description thereof is omitted herein. In the present step, a metal having a melting point in a specified range is used. About this metal also, the content thereof is the same as described the item "A. Substrate for suspension"; thus, description thereof is omitted herein.

The dropping method for dropping the metal in the state that the metal is melted is not particularly limited as far as the method is a method capable of dropping the melted metal quantitatively. Examples thereof include a method of using metallic balls having a predetermined diameter and melting and dropping the metallic balls successively, and a method of storing a metal in a predetermined container in the state that the metal is melted, and quantitatively dropping the metal bit by bit from the container.

In the invention, the dropping method is preferably the method of using metallic balls having a predetermined diameter and melting and dropping the metallic balls successively. By selecting the diameter of metallic balls as a feedstock appropriately, the drop amount of the melted metal can be adjusted at will. The diameter of the metallic balls is not particularly limited, and is usually from about 100 μm to 200 μm. In the invention, it is preferred to decide the diameter of the metallic balls, considering the size of the opening, and others.

The dropping device wherein the metallic balls are used to attain the dropping is, for example, a device having a feedstock supplying unit for supplying the metallic balls, a melting unit for melting the supplied metallic balls, and a dropping unit for dropping the metallic balls. In such a device, the metallic balls as a feedstock are first filled into the feedstock supplying unit, and then the metallic balls are successively supplied from the feedstock supplying unit to the melting unit to melt the supplied metallic balls. The manner for melting the balls is, for example, a YAG laser. Thereafter, the melted metallic balls are dropped from the dropping unit to the opening. The manner for dropping the melted metallic balls is, for example, a manner of extruding the melted metallic balls by effect of an inert gas such as $N_2$. Specific examples of such a dropping device include $SB^2$-JET manufactured by PAC-TECH PACKAGING TECHNOLOGIES Gmbh.

In the invention, it is allowable that the melted metal is dropped once or is separately dropped plural times into a predetermined amount necessary for forming the ground terminal. The case where the metal is dropped once has an advantage that the number of steps is reduced, and the case where the metal is separately dropped plural times has an advantage that the generation of an air reservoir can be restrained by dropping the metal bit by bit. In other words, the case where the metal is separately dropped plural times has an advantage that the air vent section described in the item "A. Substrate for suspension" may not be set up to the grounding-wiring layer or the insulating layer.

It is also preferred in the invention that when the metal is dropped in a metal-melted state, the diameter of the melted metal is set in such a manner that the metal is not brought into contact with the edge of the opening. Specifically, it is preferred that when the metal is dropped in a metal-melted state, the diameter of the melted metal is smaller than that of the opening. By making the diameter of the melted metal smaller than that of the opening, the melted metal can be hit with a larger certainty. According to this, the generation of an air reservoir can be restrained so that the joint area between the metallic substrate and the ground terminal increases. As a result, the joint reliability is improved. Furthermore, the precision of the hit is improved, thereby making it possible to make the grounding-wiring layer arranged near the opening small. Thus, space-saving can be attained and the weight can be small. When the vicinity of the ground terminal can be made light, the metallic substrate can also be made thin.

Figure 17A:
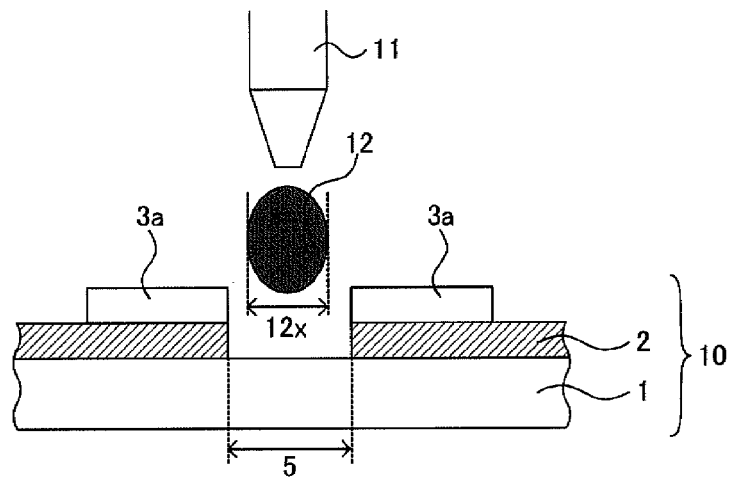
FIGS. 17A to 17C are a process chart illustrating another embodiment of a process for producing the substrate for suspension of the invention.
Figure 17B:
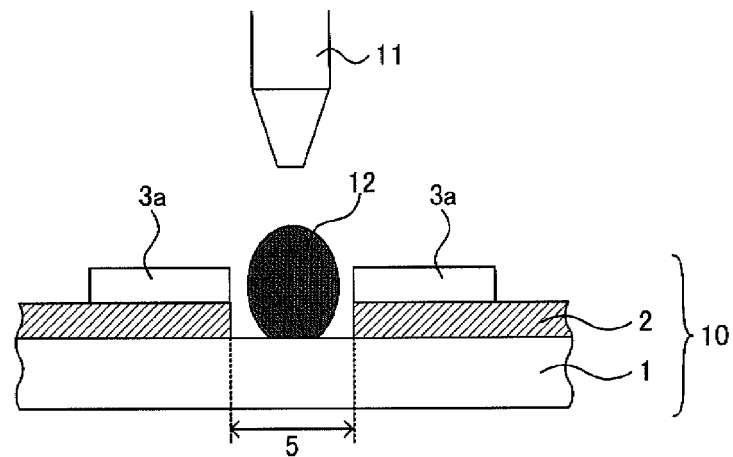
Figure 17C:
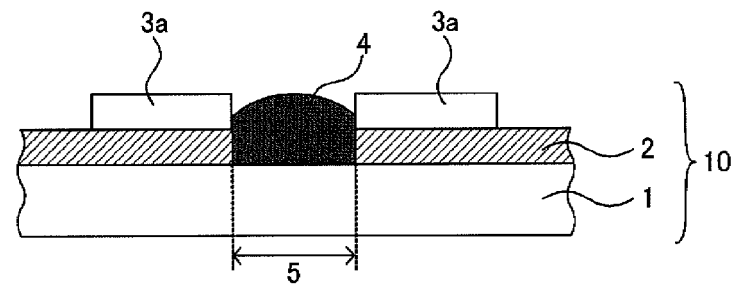

Specifically, as illustrated in FIG. 17A, at the time of using a dropping device 11 to drop a melted metal 12 into an opening 5, the diameter 12x in the horizontal direction of the melted metal 12 is made smaller than the diameter of the opening 5. As illustrated in FIG. 17B, according to this way, the melted metal 12 is easily hit onto the surface of a metallic substrate 1 exposed from the opening 5. As illustrated in FIG. 17C, the resultant ground terminal 4 is formed only inside a region surrounded by the edge of the opening 5. About the resultant ground terminal, the content thereof is the same as described in the item "A. Substrate for suspension". Thus, description thereof is omitted herein.

The diameter of the melted metal in the invention refers to the size (reference numerals 12x in FIG. 17A) in the horizontal direction of the melted metal dropped from the dropping device or the like when the metal enters the opening. The diameter of the opening is varied in accordance with the shape of the opening; in a case where the shape of the opening is, for example, a circle, the diameter refers to the diameter of the circle. In the invention, the diameter of the melted metal (actually, only the size of the solder balls is clearly specified before the balls are melted, and the diameter of the metal while the metal is melted cannot be measured) is smaller than the diameter of the opening preferably by, for example, 10 μm or more, more preferably by a value ranging from 15 μm to 30 μm.

Figure 16A:
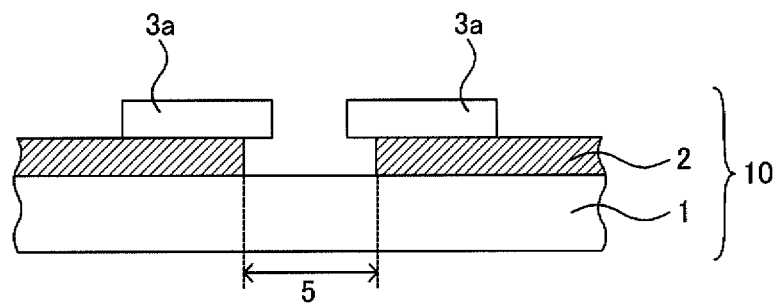
FIGS. 16A to 16C are a process chart illustrating an embodiment of a process for producing the substrate for suspension of the invention.
Figure 16B:
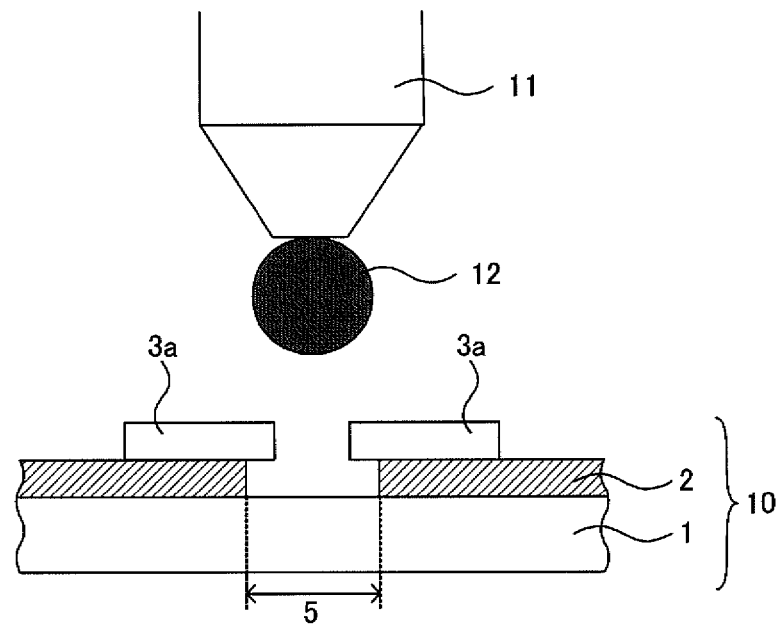
Figure 16C:
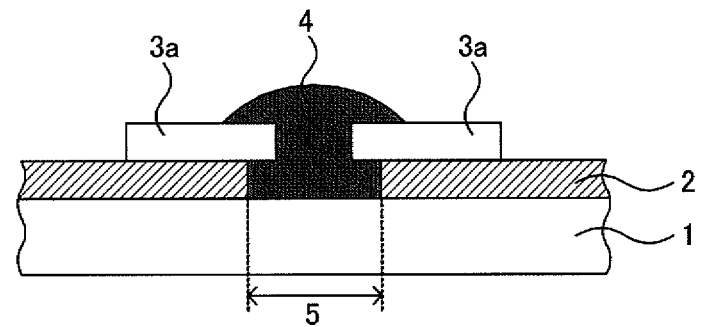

As illustrated in, for example, FIG. 16A, in a case where the diameter of the grounding-wiring layer 3a is smaller than that of the opening 5, it is preferred that the diameter of the melted metal is smaller than that of the grounding-wiring layer by a value in the above-mentioned range.

If the diameter of the melted metal is too small, the formed ground terminal may not be able to attain a sufficient connection between the metallic substrate and the grounding-wiring layer. Therefore, in a case where the ground terminal is formed by dropping the metal once, it is preferred to set the diameter of the melted metal into such an extent that the metallic substrate and the grounding-wiring layer can be sufficiently connected to each other. It is preferred to consider the relationship between the volume of the melted metal and the area of the opening at this time. Even if the diameter of the melted metal is too small, a sufficient connection between the metallic substrate and the grounding-wiring layer can be attained by dropping the metal plural times as described above.

The diameter of the melted metal is not particularly limited, and ranges usually from 40 μm to 150 μm, preferably from 60 μm to 100 μm. The diameter of the opening is usually from about 50 μm to 300 μm, as described in the item "A. Substrate for suspension". When the diameter of the melted metal is smaller than that of the opening, the diameter of the opening is preferably set into, for example, the range of 80 μm to 150 μm.

It is also preferred in the invention to subject the metallic substrate exposed from the opening to oxide-film-removing treatment, and subsequently bring the melted metal and the exposed metallic substrate into contact with each other before a metal oxide film is formed on the surface of the metallic substrate after the metallic substrate being washed. When a ground terminal is formed before the metal oxide film is formed, a ground terminal low in resistance can be obtained. Moreover, a flux-coating step and a flux-washing step are unnecessary, which is different from a method using a flux, which will be described later. Thus, the process can be made simple. Furthermore, in the case of using a flux, the flux scatters and simultaneously the ground terminal may also scatter when the melted metal is dropped. On the other hand, the oxide-film-removing treatment does not result in a problem of flux-scattering and others, and makes it possible to prevent the ground terminal from scattering.

In general, by applying oxide-film-removing treatment to the metallic substrate, a metal oxide film present on the surface of the metallic substrate can be removed. However, when the metallic substrate is allowed to stand still in the atmosphere after the oxide-film-removing treatment, a metal oxide film may again be formed on the metallic substrate surface. This metal oxide film is a component making the resistance of the ground terminal high; therefore, it is preferred to form the ground terminal before the metal oxide film is formed.

In the invention, the wording "before a metal oxide film is formed on the surface of the metallic substrate" refers to a state that a metal oxide film is not formed to such an extent that the ground terminal can exhibit a target resistance value. The target resistance value is varied in accordance with the usage of the substrate for suspension, and other factors. For example, the value is preferably 1.0Ω or less, in particular, 0.3Ω or less.

When the ground terminal is formed before the metal oxide film is formed, it appears that an intermetallic compound layer is formed in a joint interface between the ground terminal and the metallic substrate. About the intermetallic compound layer, the content thereof is the same as described in the item "A. Substrate for suspension". Thus, description thereof is omitted herein. It is also preferred in the invention to bring the melted metal and the exposed metallic substrate into contact with each other in an intermetallic-compound-layer formable period, which is a period when the intermetallic compound layer can be formed in the joint interface between the ground terminal and the metallic substrate, after the oxide-film-removing treatment is applied to the metallic substrate exposed from the opening.

When SUS 304 is used for the metallic substrate in the invention, a measurement of the composition of elements in a SUS 304 surface demonstrates that the element composition ratio of Fe/Cr is less than 1 before the oxide-film-removing treatment. This would be because a chromium oxide film is formed on the SUS 304 surface. When SUS 304 is subjected to the oxide-film-removing treatment, the chromium oxide film on the SUS 304 surface is removed so that the element composition ratio of Fe/Cr tends to increase.

It is allowable in the invention that metallic balls as a feedstock are beforehand arranged in the opening and the metallic balls are melted, thereby forming a ground terminal. This process is a process similar to the so-called SBB (solder ball bonding).

2. Other Steps

Before the melted metal is dropped into the opening, the substrate-forming member may be subjected to pre-treatment in the invention. Specific examples of the pre-treatment include: a flux treatment step for removing the metal oxide film on the metallic substrate surface exposed from the opening, an acid washing step for removing the metal oxide film on the metallic substrate surface exposed from the opening, a plasma washing step for removing organic substances remaining on the metallic substrate surface exposed from the opening, and a degreasing step for removing oil components remaining on the metallic substrate surface exposed from the opening. It is particularly preferred in the invention to conduct the plasma washing step as the pre-treatment step. In the invention, two or more of the above-mentioned pre-treatments may be combined.

The flux agent used in the flux treatment step is not particularly limited. Preferably, the agent is appropriately selected in accordance with the kind of the metallic substrate. The flux agent may be equivalent to a flux agent used for ordinary solder or the like.

In the plasma washing step, the oxide film on the metallic substrate is removed at the same time when organic residues on the metallic substrate are removed. The gas selected for the treatment is He alone, $N_2$ alone, Ar alone, or a mixed gas containing hydrogen in an amount of 3% or less. The plasma machine is preferably of a high energy-efficiency type, such as a parallel plate type, or a magnetron type.

Examples of the acid washing solution used in the acid washing step include hydrochloric acid, sulfuric acid, hydrogen peroxide, phosphoric acid, and acidic ammonium fluoride. These may be used alone or in the form of a mixture.

The degreasing method used in the degreasing step is not particularly limited, and examples thereof include alkali degreasing using sodium carbonate, sodium hydroxide or the like; emulsion degreasing; solvent degreasing; acidic degreasing using phosphoric acid, a silicate or the like; and degreasing using a surfactant, a chelating agent or the like. These may be used alone or in combination of two or more thereof.

The invention is not limited to above-mentioned embodiments. The embodiments are exemplified, and any embodiment having substantially the same structure as the technical concept recited in the claims of the invention and producing the same effects and advantages is included in the technical scope of the invention.

EXAMPLES

The invention will be more specifically described by way of the following examples.

Example 1

Formation of a Substrate-Forming Member

Prepared was a laminate wherein an SUS 304 of 20 μm thickness (metallic substrate), a polyimide layer of 10 μm thickness (insulating layer), and a Cu wiring layer of 18 μm thickness (wiring layer) made of electrolytic copper foil were laminated in this order. This laminate was subjected to chemical etching and other treatments described below, thereby yielding a substrate-forming member. First, a region of the Cu wiring layer where a ground terminal was to be formed (grounding Cu wiring layer) was worked into a shape having an outer diameter of 250 μm and an inner diameter (opening diameter) of 100 μm by chemical etching. Next, the SUS was chemically etched in order to specify the external shape of a substrate for suspension. Next, the polyimide layer was chemically etched to make an opening having a diameter of 100 μm. Thereafter, the surface of the grounding Cu wiring layer was plated with Ni up to a thickness of about 0.2 μm by electroplating, and then plated with Au up to a thickness of about 0.5 μm by electroplating. Furthermore, a photosensitive coverlay coating for wiring-protection was coated onto the resultant. The resultant was exposed to light and developed to form a coverlay having a predetermined shape. In this way, a substrate-forming member was yielded.

(Formation of Substrates for Suspension)

Next, in order to activate the SUS surface in the opening, treatment using phosphoric acid (acid washing) was conducted as pre-treatment. Thereafter, lead-free solders (solder balls) having a diameter of 0.1 mm and made of Sn-3.0Ag-0.5Cu were prepared, and an $SB^2$-JET manufactured by Pac-Tech PACKAGING TECHNOLOGIES Gmbh was used to drop the solder balls into the opening while the balls were melted. In such a way, substrates for suspension of the invention were yielded. The average of the resistance values of the ground terminals of these substrates for suspension was 6.10Ω. The ratio of substrates having a resistance of 5Ω or less out of the substrates was 40%, and the ratio of substrates having a resistance of 1Ω or less was 5%.

Example 2

Substrates for suspension were yielded in the same way as in Example 1 except that instead of the acid washing, a treatment with Ar gas was conducted in a parallel plate type plasma washing machine manufactured by March Plasma Systems, Inc. for 5 minutes before the melted solder was dropped, so as to activate the SUS surfaces. The average of the resistance values of the ground terminals of these substrates for suspension was 1.25Ω. The ratio of substrates having a resistance of 5Ω or less out of the substrates was 90%, and the ratio of substrates having a resistance of 1Ω or less was 65%.

Example 3

Substrates for suspension were yielded in the same way as in Example 1 except that instead of the acid washing, a flux (NS-23, manufactured by Nihon Superior Co., Ltd.) for SUS was coated before the melted solder was dropped, so as to activate the SUS surfaces. The average of the resistance values of the ground terminals of these substrates for suspension was 5.55Ω. The ratio of substrates having a resistance of 5Ω or less out of the substrates was 60%, and the ratio of substrates having a resistance of 1Ω or less was 5%.

Example 4

First, the same substrate-forming member as in Example 1 was prepared (opening diameter: 100 μm). Next, lead-free solders (solder balls) having a diameter of 0.1 mm and made of Sn-3.0Ag-0.5Cu were prepared, and then an $SB^2$-JET manufactured by Pac-Tech PACKAGING TECHNOLOGIES Gmbh was used to drop the melted solder balls into the opening in the state that the diameter in the horizontal direction of the melted balls was adjusted to 80 μm. In this way, a ground terminal was formed.

The invention claimed is:

1. A substrate for suspension, comprising:
   a metallic substrate,
   an insulating layer formed on the metallic substrate and having an opening from which the metallic substrate is exposed,
   a grounding-wiring layer formed on the insulating layer and arranged near the opening, and
   a ground terminal formed in the opening and contacting the metallic substrate and the grounding-wiring layer,
   wherein the ground terminal is made of a metal having a melting point of 450° C. or lower.

2. The substrate for suspension according to claim 1, wherein the ground terminal is a convex shape having an apex inside a region of the opening in planar view.

3. The substrate for suspension according to claim 1, wherein a metal forming the ground terminal is a lead-free solder.

4. The substrate for suspension according to claim 1, wherein the grounding-wiring layer is formed to surround the opening in planar view, and
   further wherein the grounding-wiring layer has an air vent section for restraining an air reservoir generated when the ground terminal is formed.

5. The substrate for suspension according to claim 1, wherein a form of the grounding-wiring layer near the opening is a line form.

6. The substrate for suspension according to claim 1, wherein the ground terminal is formed only inside a region surrounded by an edge of the opening.

7. The substrate for suspension according to claim 1, wherein an intermetallic compound layer is formed in a joint interface between the ground terminal and the metallic substrate.

8. A process for producing a substrate for suspension, comprising steps of:
   preparing a substrate-forming member which comprises a metallic substrate, an insulating layer formed on the metallic substrate and having an opening from which the metallic substrate is exposed, and a grounding-wiring layer formed on the insulating layer and arranged near the opening; and
   a ground-terminal-forming step of dropping a metal having a melting point of 450° C. or lower quantitatively into the opening in a state that the metal is melted, and forming a ground terminal contacting the metallic substrate and the grounding-wiring layer.

9. The process for producing a substrate for suspension according to claim 8, wherein a dropping method for dropping the metal quantitatively in the state that the metal is melted is a method of using plural metallic balls each having a predetermined diameter, and melting and dropping the metallic balls successively.

10. The process for producing a substrate for suspension according to claim 8 wherein when the metal is dropped in the state that the metal is melted, a diameter of the melted metal is smaller than a diameter of the opening.

11. The process for producing a substrate for suspension according to claim 9, wherein when the metal is dropped in the state that the metal is melted, the diameter of the melted metal is smaller than a diameter of the opening.

* * * * *